(12) United States Patent
Bachmaier et al.

(10) Patent No.: US 8,970,079 B2
(45) Date of Patent: Mar. 3, 2015

(54) METHOD FOR ADJUSTING RESISTANCE OF ELECTROMAGNET IN MAGNETIC BEARING AND FOR SENSORLESS DETERMINATION OF POSITION OF OBJECT MOUNTED IN MAGNETIC BEARING, TAKING INTO ACCOUNT ADJUSTED VALUE OF RESISTANCE (75) Inventors: Georg Bachmaier, München (DE); Christian Bachmann, München (DE); Dominik Bergmann, Sachsenkam (DE); Tobias Glück, Vienna (AT); Wolfgang Kemmetmüller, Vienna (AT); Andreas Kugi, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 13/636,630

(22) PCT Filed: Mar. 8, 2011

(86) PCT No.: PCT/EP2011/053423
§ 371 (c)(1),
(2), (4) Date: Nov. 26, 2012

(87) PCT Pub. No.: WO2011/120764
PCT Pub. Date: Oct. 6, 2011

(65) Prior Publication Data
US 2013/0062982 A1  Mar. 14, 2013

(30) Foreign Application Priority Data
Apr. 1, 2010  (DE) .................. 10 2010 013 682

(51) Int. Cl.
*H02K 7/09*  (2006.01)
*F16C 32/04*  (2006.01)

(52) U.S. Cl.
CPC .......... *F16C 32/0451* (2013.01); *F16C 32/0448* (2013.01); *F16C 32/0457* (2013.01)
USPC ........................ 310/90.5; 310/68 B; 310/68 R (58) Field of Classification Search
USPC ........ 310/90.5, 68 R, 68 B, 51; 318/606–608
See application file for complete search history.

(56) References Cited

U.S. PATENT DOCUMENTS 5,666,013 A * 9/1997 Mizuno .................. 310/90.5
6,657,345 B2 * 12/2003 Shinozaki .................. 310/90.5
(Continued)

FOREIGN PATENT DOCUMENTS

CN  101033775  9/2007
DE  102008064380 A1  6/2010
(Continued)

OTHER PUBLICATIONS

German Translation of Japanese Office Action mailed Dec. 2, 2013 in corresponding Japanese Application No. 2013-501713.
(Continued)

*Primary Examiner* — Thanh Lam
(74) *Attorney, Agent, or Firm* — Staas & Halsey LLP (57) ABSTRACT For an object on a bearing mounting having a magnetic bearing providing a magnetic field generally produced by an electromagnet, the bearing is regulated based on a position of the object relative to the bearing. The position of the object is determined by reference to an estimate of the inductance obtained using a least squares method, in which the electrical resistance of the bearing is taken into account. The resistance is subject to variations, for example due to temperature fluctuations; however, the electrical resistance can be estimated by regulating the inductance error, $\Delta \hat{L} = \hat{L}_{2,s}^{LS} - \hat{L}_{1,s}^{LS}$ down to zero, where the resistance adjustment facility may be a low-pass filter and an integration controller.

11 Claims, 2 Drawing Sheets

(56) References Cited

U.S. PATENT DOCUMENTS

| | | | |
|---|---|---|---|
| 6,984,907 B2* | 1/2006 | Barada | 310/90.5 |
| 7,830,056 B2 | 11/2010 | Barada et al. | |
| 7,977,839 B2 | 7/2011 | Barada et al. | |
| 2002/0047405 A1* | 4/2002 | Shinozaki | 310/90.5 |
| 2009/0096302 A1 | 4/2009 | Barada et al. | |
| 2011/0012456 A1 | 1/2011 | Barada et al. | |

FOREIGN PATENT DOCUMENTS

| | | |
|---|---|---|
| EP | 1 903 228 A1 | 3/2008 |
| JP | 7-71456 | 3/1995 |
| JP | 11-82511 | 3/1999 |
| JP | 2005-140722 | 6/2005 |
| JP | 2007-198476 | 8/2007 |
| JP | 2009-275740 | 11/2009 |
| JP | 5118329 | 10/2012 |

OTHER PUBLICATIONS

D. Pawelczak: "Nutzung inhärenter Messeffekte von Aktoren und Methoden zur sensorlosen Positionsmessung im Betrieb", Diss., Universität der Bundeswehr München, Jun. 10, 2005; pp. 1-138.

Q. Yuan et al."Self-sensing Actuators in Electrohydraulic Valves", Proceedings of 2004 International Mechanical Engineering Congress and Exposition, Nov. 2004; pp. 1-7.

M. D. Noh: "Self-Sensing Magnetic Bearings Driven by a Switching Power Amplifier", Diss., University of Virginia, School of Engineering and Applied Science, Jan. 1996; pp. i-x, 1-109.

N. Skricka: "Entwicklung eines sensorlosen akti-ven Magnetlagers", Fortschritt-Berichte, vol. 8, No. 1027, VDI-Verlag Düsseldorf, 2004; pp. 1-170.

International Search Report for PCT/EP2011/053423; mailed Sep. 5, 2011.

German Translation of Office Action issued Jun. 9, 2014 in corresponding Japanese Patent Application No. 2013-501713.

Office Action dated May 5, 2014 in corresponding Chinese Patent Application No. 201180016689.1 with partial German Translation.

* cited by examiner

METHOD FOR ADJUSTING RESISTANCE OF ELECTROMAGNET IN MAGNETIC BEARING AND FOR SENSORLESS DETERMINATION OF POSITION OF OBJECT MOUNTED IN MAGNETIC BEARING, TAKING INTO ACCOUNT ADJUSTED VALUE OF RESISTANCE

CROSS REFERENCE TO RELATED APPLICATIONS

This application is the U.S. national stage of International Application No. PCT/EP2011/053423, filed Mar. 8, 2011 and claims the benefit thereof. The International Application claims the benefits of German Application No. 102010013682.4 filed on Apr. 1, 2010, both applications are incorporated by reference herein in their entirety.

BACKGROUND

Described below is sensorless position determination for a magnetic bearing. Such a magnetic bearing is used for mounting an object, for example a rotor, with the aid of a magnetic field which is produced, in general, by at least one electromagnet.

The essential advantage of a magnetic bearing compared to a classical bearing, for example using a roller bearing, lies in its almost complete lack of friction. This represents an advantage, in particular in respect of its wear. On the other hand, it is only by this that a bearing mount for very rapidly rotating rotors becomes possible. One difficulty with electromagnetic bearing mountings is in the fact that electronic regulation of the position of the object which is to be mounted is indispensable. For this purpose, the main requirement is a determination of the position of the object relative to the electromagnet. In addition, the speed at which a change in position is completed can be determined directly. Classically, the position is determined directly using a position sensor. However, the use of a position sensor is associated with certain disadvantages. Of these, particular mention should be made of the fact that a position sensor throws up additional costs, a certain amount of installation space is required for building in the sensor, and the sensor can, if it fails, be responsible for a failure of the entire magnetic bearing system.

For this reason, in recent years a host of so-called sensorless or position-sensorless methods have been suggested for regulating a magnetic bearing. These methods forgo the use of a position sensor and attempt instead to draw conclusions about the position, and possibly also the speed, of the object for which the bearing is used, on the basis of the measurement of the electromagnet's current and the voltage. In these cases, the position sensor is replaced either by evaluation electronics or by an estimation and observation algorithm. This makes an estimate of the current position, and possibly also an estimate of the current speed, in each case relative to the object for which the bearing is to be used.

When one looks at known magnetic bearings, an electromagnet exercises an attractive force on a suspended body. Working against this attractive force are disruptive forces, e.g. the force due to the weight of suspended body. At a certain distance a balance of forces arises. At constant current the attractive force rises as the body approaches the electromagnet. It reduces if the body moves away from the electromagnet. Because of its physical characteristics, a magnetic bearing is unstable, and must therefore be controlled. Data about the movement behavior of the suspended body is obtained by a controller from a position sensor, for example. If the magnetic bearing is a sensorless one, an external sensing system is omitted. Since control/regulation is necessary even for sensorless magnetic bearings, the position data required for the purpose is obtained by the characteristics of the electromagnet which depend on the air gap.

Figure 1:
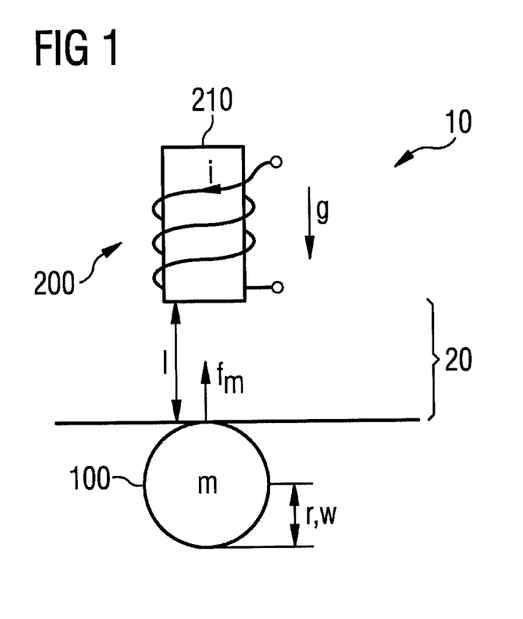
FIG. 1 is a schematic diagram of a magnetic bearing.

The basic principle of sensorless position determination for a magnetic bearing, using measurement of the voltage and current, can be seen by reference to FIG. 1. FIG. 1 shows a sketch of the principle of a magnetic bearing 10. Seen here is a unidirectional bearing with an electromagnet 200. Together with the object 100 for which the bearing is required, a pole 210 of the electromagnet 200 forms an air gap 20, the size 1 of which changes as a function of the position r of the object 100. The formula used for calculating the magnetic resistance $R_m$ of the air gap 20 is $$R_m = \frac{1}{\mu_o A} \qquad (1)$$

where the length $l=l_0-r$, the nominal length $l_0$ together with the effective area A of the air gap and the permeability $\mu_0$ of air.

If one neglects from here on the magnetic resistance of the iron core of the electromagnet 200 and that of the object 100, then the inductance L of the magnetic bearing 10 is calculated in the form of the equation $$L(r) = \frac{M^2}{R_m} = \frac{M^2 \mu_0 A}{l_0 - r} \qquad (2)$$

where M is the number of windings in the electromagnet 200. It is clear that the inductance of the system is an inversely proportional function of the distance of the object 100 from the poles of the electromagnet 200. This essential characteristic represents the basis for many estimation and observation algorithms for determining the position of the object 100. In this connection, the following publications from the related art should be noted: D. Pawelczak, "Nutzung inharenter Messeffekte von Aktoren and Methoden zur sensorlosen Positionsmessung im Betrieb" [The use of inherent measurement effects of actuators and methods for the sensorless measurement of position in operation], Diss., Universitat der Bundeswehr Munchen, 2005; N. Skricka, "Entwicklung eines sensorlosen aktiven Magnetlagers" [Development of a sensorless active magnetic bearing], Fortschritt-Berichte, Vol. 8, No. 1027, VDI-Verlag Düsseldorf, 2004; and Yuan Qing Hui et al., "Self-sensing actuators in electrohydraulic valves", Proceeding of the International Mechanical Engineering Congress and Exposition, Anaheim, Calif., 2004.

A host of aids exist for the sensorless operation of a magnetic suspension system, the essential approaches of which, together with their advantages and disadvantages, are itemized and analyzed in DE 10 2008 064 380 A1. In that are discussed observer-based methods, parameter estimation methods and various groups of methods for the determination of inductance. The latter methods exploit the fact that the inductance of a magnetic bearing depends on the position of the object. Thus a measurement of the inductance permits the position of the object to be determined.

DE 10 2008 064 380 A1 itself, on which the present application builds, finally proposes a method for the sensorless estimation of the state of magnetic suspension systems in which the position is determined by an evaluation of the current and the voltage. However, in the method there described, an inaccuracy can arise because the electrical resistance of the magnetic bearing, which must be an input when determining the inductance, is not adequately taken into account.

SUMMARY

Hence, the underlying method provides for adjustment of a value for the resistance of an electromagnet in a magnetic bearing. Over and above this, is an improved method for sensorless determination of the position of an object mounted in a magnetic bearing, taking into account the adjusted resistance value.

The method for the adjustment of the value of an electrical resistance of a magnetic bearing includes the following:
- actuation of at least one electromagnet in the magnetic bearing by a pulse width modulated (PWM) voltage, wherein the waveform of the pulse width modulated voltage has at least one first phase (j=1), in particular a charging up phase, and at least one second phase (j=2), in particular a discharge phase,
- measurement and evaluation of the current i through and voltage u across the electromagnet, for the purpose of determining a first and a second inductance value $\hat{L}_1^{LS}$, $\hat{L}_2^{LS}$ in the first phase (j=1) and in the second phase (j=2) respectively,
- estimation, in particular least squares estimation, of the first inductance value $\hat{L}_1^{LS}$ for the first phase (j=1) and of the second inductance value $\hat{L}_2^{LS}$ for the second phase (j=2), wherein the electrical resistance $R_n$ of the magnetic bearing, in particular of the electromagnet in the magnetic bearing, is taken into account in estimating the inductance values $\hat{L}_1^{LS}$, $\hat{L}_2^{LS}$,
- determination of the inductance error $\Delta \hat{L} = \hat{L}_2^{LS} - \hat{L}_1^{LS}$ and adjustment of the electrical resistance by regulating the inductance error $\Delta \hat{L}$ down to zero.

The resistance adjustment here may be made by a low pass filter and an I (integration) controller.

The inductance error $\Delta \hat{L}$ is regulated down to zero using an I controller $$\frac{d}{dt}\hat{R} = -\frac{1}{T_{RA}}\Delta \overline{L},$$

and if necessary filtered beforehand using low pass filtering $$\frac{d}{dt}\Delta \overline{L} = -\frac{1}{T_{LF}}(\Delta \overline{L} - \Delta \hat{L}).$$

The method for sensorless determination of the position relative to the magnetic bearing of an object mounted in a magnetic bearing, in particular relative to an electromagnet in the magnetic bearing, includes the following:
- actuation of at least one electromagnet in the magnetic bearing by a pulse width modulated (PWM) voltage, wherein the waveform of the pulse width modulated voltage has at least one first phase (j=1), in particular a charging up phase, and at least one second phase (j=2), in particular a discharge phase,
- measurement and evaluation of the current i through and voltage u across the electromagnet, for the purpose of determining a first and a second inductance value $\hat{L}_1^{LS}$, $\hat{L}_2^{LS}$ in the first phase (j=1) and in the second phase (j=2) respectively,
- estimation, in particular least squares estimation, of the first inductance value $\hat{L}_1^{LS}$ for the first phase (j=1) and of the second inductance value $\hat{L}_2^{LS}$ for the second phase (j=2), wherein the electrical resistance $R_n$ of the magnetic bearing, in particular of the electromagnet in the magnetic bearing, is taken into account in estimating the inductance values $\hat{L}_1^{LS}$, $\hat{L}_2^{LS}$,
- calculation of the position of the object relative to the magnetic bearing by reference to the estimated inductance values $\hat{L}_1^{LS}$, $\hat{L}_2^{LS}$.

In doing this, the electrical resistance $R_n$ is determined using the method described above for the adjustment of the resistance.

For the purpose of calculating the position of the object, use is made of a mean inductance $\overline{L}$ determined from the estimated inductance values $\hat{L}_1^{LS}$, $\hat{L}_1^{LS}$.

If necessary, the speed of the object is also calculated from the estimated inductance values $\hat{L}_1^{LS}$, $\hat{L}_2^{LS}$.

The current $i_{k_j,j}$ (for $k_j=0, \ldots, N_j-1$) is measured at $N_1$ measurement points in the first phase (j=1), and at $N_2$ measurement points in the second phase (j=2).

For each of the first phase (j=1) and the second phase (j=2) a mean current value $\bar{i}_j$ is formed from the current values $i_{k_j,j}$ (for $k_j=0, \ldots, N_j-1$) measured at the $N_j$ measurement points.

For each of the first phase (j=1) and the second phase (j=2) a current starting condition $\hat{i}_{0,j}$ and a current finishing condition $\hat{i}_{N_j-1,j}$ are determined, in particular by a least squares method. From these conditions, current level differences $\Delta i_j = \hat{i}_{N_j-1,j} - \hat{i}_{0,j}$ are determined for the first phase (j=1) and for the second phase (j=2), where the current level differences $\Delta i_j$ are inputs into the estimation of the inductance values $\hat{L}_1^{LS}$, $\hat{L}_2^{LS}$.

For the purpose of calculating the mean value $\overline{L}$ of the inductance, from which ultimately the position and/or the speed of the object is calculated, use is made of
- the current level differences $\Delta i_j = \hat{i}_{N_j-1,j} - \hat{i}_{0,j}$, determined from the current starting and current finishing conditions
- the numbers of measurement points $N_1$, $N_2$,
- the mean current values $\bar{i}_j$ in the first (j=1) and the second phase (j=2), and
- the difference between the estimated inductance values $\hat{L}_1^{LS}$, $\hat{L}_2^{LS}$ for the first (j=1) and the second phase (j=2).

The position estimation considered in this method is based on the identification of the present inductance value L(r), using which it is possible to calculate back to the present position r of the object for which the bearing is to be used. Unlike the procedures for estimating the inductance known in the literature, in this method no additional measurement signal, such as for example a sinusoidal one, is injected into the actuation of the coil, but rather the actuation is effected directly using a pulse width modulated voltage.

The advantage of this is the fact that no additional hardware is required for generating and for sensing the additional measurement signal. The methods known from Pawelczak and Skricka, cited above, which are based on an evaluation of the pulse width modulated voltage, have the disadvantage that a change in the pulse width leads to a significant distortion in the identified inductance value, and hence the identified position. In the method described below, this problem area is circumvented by an appropriate evaluation of the measurement signals.

Most of the estimation methods for the determination of the inductance use expensive analog preprocessing electronics as described in Noh, Myounggyu D.: "Self-Sensing Magnetic Bearings Driven by Switching Power Amplifier", Diss., University of Virginia, Faculty of the School of Engineering and Applied Science, 1996. Using the method, it is advantageous that the entire processing of the measurement signals is carried out digitally. In order to enable the short sampling intervals or high sampling rates, as applicable, required in the processing, the development of appropriate algorithms is, as will be shown in the description of the method, unavoidable.

The estimation algorithm described below is essentially a least squares estimator for determining the inductance in the individual PWM phases, i.e. in the charging up and discharge phases. As will be shown below, this least squares estimator can in turn be subdivided into two sub-tasks, which leads to an exceptionally efficient implementation.

Further, it is possible to apply a model-based calculation of the position and/or speed of the object for which the bearing is to be used.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In order to calculate the magnetic force on the object 100 shown in FIG. 1, we define the magnetic co-energy $$W_m = \frac{1}{2} L(r) i^2 \quad (3)$$

for a current i through the electromagnet which is also shown in FIG. 1. From this one obtains directly the following expression for the magnetic force $f_m$ $$f_m = -\frac{\partial W_m}{\partial r}. \quad (4)$$

Figure 2A:
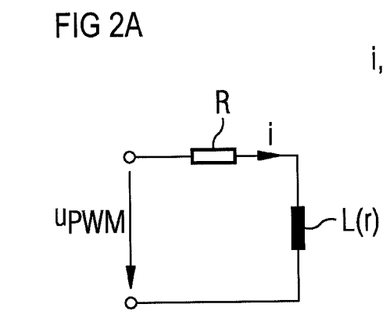
FIG. 2A is an electrical equivalent circuit diagram for a magnetic suspension system.
Figure 2B:
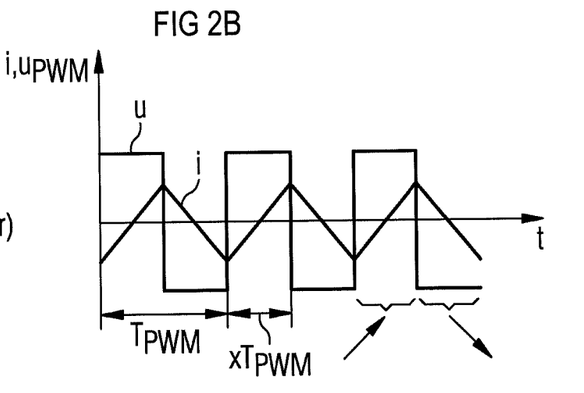
FIG. 2 is a graph associated with the diagram in FIG. 2B illustrating the charging up and discharge processes for the coil.

FIG. 2 shows the electrical equivalent circuit diagram for a simple magnetic bearing.

In this, R designates the effective electrical resistance of the coil and its connecting wires, and $u_{PWM}$ is the applied pulse width modulated voltage.

If one writes Faraday's law for this system then one obtains $$\frac{di}{dt} = \frac{1}{L(r)} \left( -R \cdot i - \frac{\partial L(r)}{\partial r} w + u_{PMW} \right), i(0) = i_0, \quad (5)$$

where w=r is the speed of the object for which the bearing is to be used.

The application of a pulse width modulate voltage has the effect that the current i in a first phase of the PWM, the so-called charging up phase, increases over an interval $0 \leq t \leq \chi T_{PWM}$ and over a succeeding second phase of the PWM, the so-called discharge phase, declines over an interval $\chi T_{PWM} \leq t \leq T_{PWM}$. Here, refers to the interval of time which covers the two phases of the pulse width modulated voltage, and $0 \leq \chi \leq 1$ refers to the duty cycle. $\chi$ thus gives the relationship between the time intervals for the first and second phases. The result is a current waveform roughly like that shown in the right hand side of FIG. 2.

If one now considers again Faraday's law (5), then one can see that the amplitude of, or the slopes of, the current waveform, as applicable, are influenced on the one hand by the inductance L(r), this is the primary measurable effect, but on the other hand also by the electrical resistance R, the speed w of the object 100 together with the amplitude and the duty cycle of the supply voltage u.

The objective of position estimation is to estimate a value for the inductance from the current and the voltage measurements, and from this to determine the position r. The particular difficulty lies in realizing this in a way which, as far as possible, is independent of the other influencing factors.

Figure 3:
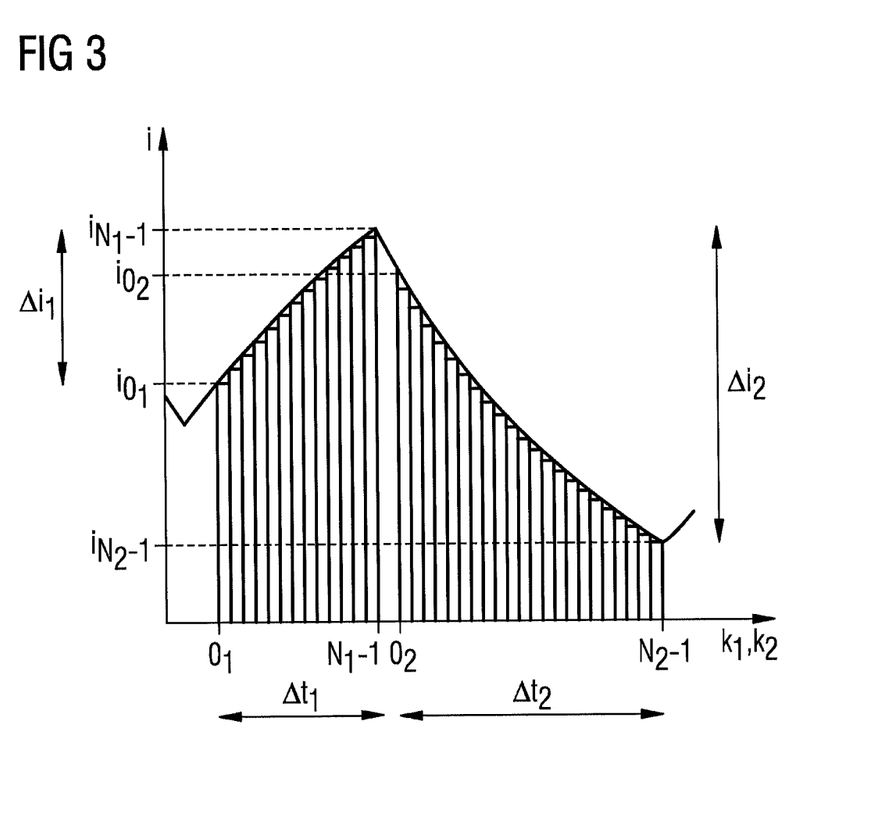
FIG. 3 is a graph illustrating the charging up and discharge processes for the coil current i for a pulse width modulated voltage injection PWM.

Least Squares Estimators/Estimators Based on the Principle of the Smallest Value for the Sum for the Squared Errors The estimation of the inductance is based on Faraday's law of electrodynamics, reorganized by equidistant time discretization, as illustrated in FIG. 3, so that a linear least squares method for the recursive determination of the inductance can be applied.

FIG. 3 shows the waveform of the current i in the first and in the second phase. In the charging up or first phase (j=1) the current is measured at $N_1$ discrete measurement points $k_1$, i.e. giving $N_1$ measured values $i_{k_1,1}$ (for $k_1=0, \ldots, N_1-1$) for the current. Correspondingly, in the discharge or second phase (j=2), current measurements are made at $N_2$ discrete measurement points, and the result is $N_2$ measured values $i_{k_2,2}$ (for $k_2=0, \ldots, N_2-1$) for the current. Corresponding remarks apply for the voltage measurement.

For the purpose of inductance estimation, least squares estimation is carried out in each case for the charging up and discharge phases, and hence two individual inductance values $\hat{L}_j^{LS}$ and two current starting conditions $\hat{i}_{0,j}$ are obtained for each PWM period. Here, and in what follows, it is always the case that $j \in \{1, 2\}$, where j=1 refers to the first (charging up) phase and j=2 to the second phase (discharge phase).

In addition, using another least squares estimation, the current finishing conditions $\hat{i}_{N_j-1,j}$ are also determined for the partial current waveforms, and these are used in the later model-based determination of the position and speed.

The terms "current starting condition" and "current finishing condition" thus refer to the current value at the start and the end respectively of each individual phase (j=1 or j=2), i.e. for $k_j=0$ or $k_j=N_j-1$.

The least squares procedure can be structured in the form of a multi-rate procedure, so that the entries which are to be determined for the so-called regressors are calculated with a short sampling interval $T_S$ and following on from this the actual regression, i.e. the determination of the partial inductances and the starting and finishing conditions of the current, can be made with a significantly longer sampling interval $T_r$, which in general is an integral multiple of the length of the PWM period.

Estimating the Inductance and Current Starting Condition

If one writes Faraday's law in the form $$\dot{\psi}(t)=u(t)-Ri(t), \psi(0)=\psi_0 \quad (6)$$

for a constant electrical resistance R, and integrates over the time interval $\Delta t = t - t_0$, one obtains $$\int_{t_0}^{t} \dot{\psi}(\tau) d\tau = \psi(t) - \psi(t_0) = \int_{t_0}^{t} u(\tau) - Ri(\tau) d\tau. \quad (7)$$

If one considers in addition the dependence of the inductance L(r) on the position r of the object in the relationship between the flux linkage $\psi(t)$ and the current i(t), $$\psi(t) = L(r(t)) \cdot i(t), \quad (8)$$

equation (7) can then be written in the form $$L(r(t)) \cdot i(t) - L(r(t_0)) \cdot i(t_0) = \int_{t_0}^{t} u(\tau) - R \cdot i(\tau) d\tau, \quad (9)$$

and solving for the current i(t) one obtains $$i(t) = \frac{L(r(t_0))}{L(r(t))} i(t_0) + \frac{1}{L(r(t))} \int_{t_0}^{t} u(\tau) - R \cdot i(\tau) d\tau. \quad (10)$$

If one assumes initially that the changes in the inductance L(r) over one PWM period are negligible, i.e. $L(r(t))=L(r(t_0))$, and one discretizes the integral $\psi(t)$ for example as a partial sum with the equidistant integration intervals $T_S$ (other discretization methods are of course also possible), then one obtains, for the first and second phases (j=1, 2) for $N_j$ measurements of the voltage $u_{k_j,j}$ and the current $i_{k_j,j}$ the discretized integral (cf. FIG. 3):

$$\check{\psi}_{0j} = 0$$

for $k_j = 0$ and $j \in \{1, 2\}$ $$\check{\psi}_{kj} = \sum_{m_j=1}^{k_j} (u_{m_j-1} - R \cdot i_{m_j-1}) T_s$$

for $k_j = 1, \ldots, N_j - 1$ and $j \in \{1, 2\}$

Under the assumption that the inductance remains constant for the duration of a rising flank (first phase) and a falling flank (second phase) of one PWM period, one obtains from equation (10) the relationship $$i_{k_j} = L_j^{-1}(\psi_{0j} + \check{\psi}_{k_j}) = i_{0_j} + L_j^{-1} \check{\psi}_{k_j} \text{ for } k_j = 0, \ldots, N_j-1 \text{ and } j \in \{1, 2\} \quad (11)$$

between the coil current and the flux linkage, with the current starting condition $i_{0j} = L_{0j}^{-1} \psi_{0j}$.

If the partial sum is in addition normalized to the sampling interval $T_S$, so that $\tilde{\psi}_j = \check{\psi}_j / T_S$, the result is the normalized inductance $\tilde{L}_j^{-1} = L_j^{-1} T_s$ as a formal parameter, and equation (10) can be written in vector notation as follows:

$$i_{k_j} = \underbrace{\begin{bmatrix} 1 & \tilde{\psi}_{kj} \end{bmatrix}}_{s_{kj}^T} \underbrace{\begin{bmatrix} i_{0j} \\ \tilde{L}_j^{-1} \end{bmatrix}}_{\theta_j} \quad (12)$$

for $k_j = 1, \ldots, N_j - 1$ and $j \in \{1, 2\}$

Hence, for $N_j$ measurements one obtains $$\underbrace{\begin{bmatrix} i_{0_j} \\ i_{1_j} \\ \vdots \\ i_{N_j-1} \end{bmatrix}}_{y_j} = \underbrace{\begin{bmatrix} 1 & \tilde{\psi}_{0j} \\ 1 & \tilde{\psi}_{1j} \\ \vdots & \vdots \\ 1 & \tilde{\psi}_{N_j-1} \end{bmatrix}}_{S_j} \underbrace{\begin{bmatrix} i_{0_j} \\ \tilde{L}_j^{-1} \end{bmatrix}}_{\theta_j}, j \in \{1, 2\} \quad (13)$$

with the ($N_j \times 1$)-dimensional measurement vector $y_j$ and the ($N_j \times 2$)-dimensional regression matrix $S_j$. The best possible approximation $\hat{\theta}_j = [\hat{i}_{0_j} \; \hat{\tilde{L}}_j^{LS}]$ in the sense of the least squares of the errors is given by $$\hat{\theta}_j = (S_j^T S_j)^{-1} S_j^T y_j = \Xi_j^{-1} \xi_j, j \in \{1, 2\}. \quad (14)$$

This gives the symmetrical (2×2) matrix $$S_j^T S_j = \begin{bmatrix} N_j & \sum_{k_j=0}^{N_j-1} \tilde{\psi}_{kj} \\ \sum_{k_j=0}^{N_j-1} \tilde{\psi}_{kj} & \sum_{k_j=0}^{N_j-1} \tilde{\psi}_{kj}^2 \end{bmatrix} = \begin{bmatrix} \Xi_{11_j} & \Xi_{12_j} \\ \Xi_{21_j} & \Xi_{22_j} \end{bmatrix} \quad (14A)$$

and the (2×1) vector $$S_j^T y_j = \begin{bmatrix} \sum_{k_j=0}^{N_j-1} i_{k_j} \\ \sum_{k_j=0}^{N_j-1} i_{k_j} \tilde{\psi}_{kj} \end{bmatrix} = \begin{bmatrix} \xi_{1_j} \\ \xi_{2_j} \end{bmatrix}. \quad (14B)$$

At this point, one can now illustrate the splitting of the least squares identification algorithm for the current starting condition and the (inverse) inductance into two different sampling rates. The $N_j$ measured values of the current $i_{k_j}$ are sensed using the fast sampling interval $T_s$. In each of these fast samplings, the entries in the symmetrical matrix $S_j^T S_j$ and in the matrix $S_j^T y_j$ must be updated to the present state. As can be seen however, this requires only the simple computational operations of summation and multiplication. In particular, for the entry $\Xi_{11_j}$ it is only necessary to specify the number of measured values. Furthermore, the calculation of $\Xi_{22_j}$ requires only one additional multiplication and addition. Finally, for the calculation of the entry $\xi_{1_j}$ one requires one addition and for $\xi_{2_j}$ one multiplication and one addition.

As can be seen, only very few, relatively simple operations are thus required within any one sampling interval $T_s$. The measured values of the current and the voltage are determined using an ADC (analog-digital converter) and supply an integral value corresponding to their resolution. Consequently, the above operations can, for example, be determined by a fixed point processor without significant loss of precision.

For the purpose of calculating the inductance and the current starting condition, it is necessary at the end to calculate the inverse of the matrix $S_j^T S_j$ and multiply it by $S_j^T y_j$. Numerically, these operations are significantly more sensitive, and should therefore be carried out, for example, on a floating point processor. However, because these operations must only be carried out once in a PWM period (where $T_{PWM} \gg T_s$), it is possible to use for this calculation a very simple and hence low cost processor.

In summary then, the above calculations can be split up into a fast calculation on a fixed point processor and a slow calculation on a floating point processor.

Estimating the Current Condition

A model-based calculation of the position and/or speed requires the current level differences $\Delta i_j = i_{N_j-1} - i_{0_j}$ where $j \in \{1, 2\}$. Using the above determination of the current starting condition $i_{0_j}$, it is possible to estimate the current finish conditions $i_{N_j-1}$, in an additional least squares estimation. For this purpose, the waveform i(t) is estimated over both of the phases j=1 and j=2, using a linear discrete approximation. In vector notation, this gives the following equation with the gradients $\eta_j$ and the step length $T_S$:

$$i_{k_j} = \underbrace{[\begin{array}{cc} 1 & k_j \end{array}]}_{q_{k_j}^T} \underbrace{\begin{bmatrix} i_{0_j} \\ \eta_j T_s \end{bmatrix}}_{\rho_j} \quad (15)$$

for $k_j = 0, \ldots, N_j - 1$ and $j \in \{1, 2\}$.

For $N_j$, $j \in \{1, 2\}$ measurements one then obtains $$\underbrace{\begin{bmatrix} i_{0_j} \\ i_{1_j} \\ \vdots \\ i_{N_j-1} \end{bmatrix}}_{h_j} = \underbrace{\begin{bmatrix} 1 & 0 \\ 1 & 1 \\ \vdots & \vdots \\ 1 & N_j-1 \end{bmatrix}}_{Q_j} \underbrace{\begin{bmatrix} i_{0_j} \\ \eta_j T_s \end{bmatrix}}_{\rho_j} \quad (16)$$

for $j \in \{1, 2\}$ with the ($N_j \times 1$)-dimensional measurement vector $h_j$ and the ($N_j \times 2$)-dimensional regression matrix $Q_j$ in the equation to be solved $\hat{\rho}_j = (Q_j^T Q_j)^{-1} Q_j^T h_j$.

The current finishing conditions $\hat{i}_{N_j-1}$ can then be calculated from $$\hat{i}_{N_j-1} = \hat{i}_{0_j} + \hat{\eta}_j T_s (N_j - 1) = \hat{\rho}_{1j} + \hat{\rho}_{2j} (N_j - 1) \quad (17)$$

It must be noted that only one further entry must be determined additionally in the fast sampling interval $T_S$.

Model-Based Averaging

From the least squares method one obtains for each PWM period two values for the inductance and two values each for the current starting value and current finishing value, in each case one for the rising and one for the falling flank, or for the first and second phase respectively. The simplest possibility for calculating a position from the two inductances $\hat{L}_1^{LS}, \hat{L}_2^{LS}$ is an averaging of the values and a model-based back calculation using equation (10). However, this very simple approach leads to several disadvantages: (i) the influence of the speed of the object for which the bearing is used is not taken into consideration, (ii) a change in the duty cycle of the PWM is left out of consideration and (iii) the speed of the object would have to be determined by an approximating differentiation of the position.

In order now to get round these problems, a suitable calculation algorithm is specified. To this end, using the current level differences $\Delta i_j$ formed from the current starting and finishing conditions, the number of measurement points $N_j$ and the mean current values $\bar{i}_j$ for the two phases with $j \in \{1, 2\}$ in combination with the difference in the individual inductances $\hat{L}_1^{LS}, \hat{L}_2^{LS}$ in the sub-periods, the position and speed of the object for which the bearing is used are calculated on the basis of a model.

Determination of the Inductances

In the determination of the estimated values $\hat{L}_j^{LS}$ by least squares identification, the assumption has been made that the inductance is constant for the duration of the rising and falling flanks over the time of one PWM period, i.e. it is finally the equation $$\hat{L}_j^{LS} \frac{di(t)}{dt} = u - R \cdot i, \; i(0) = i_0, \; j \in \{1, 2\} \quad (18)$$

which is used, with the electrical resistance R. An integration over the time interval $\Delta t_j = t_{1_j} - t_{0_j}$ gives $$\hat{L}_j^{LS} = \frac{1}{\Delta i_j} \int_{t_{0_j}}^{t_{1_j}} u(\tau) - R \cdot i(\tau) d\tau \quad (19)$$

where $\Delta i_j = i(t_{1_j}) - i(t_{0_j})$ designates the current level difference within this interval of time.

For the case that the object moves, that is that the speed $w \neq 0$, it is necessary to use the total differential of the flux linkage, in the form $$\frac{d\psi(t)}{dt} = \frac{dL(t)}{dt} i(t) + L(t) \frac{di(t)}{dt} = u(t) - R \cdot i(t) \quad (20)$$

and to integrate it over the time interval $\Delta t_j = t_{1_j} - t_{0_j}$.

$$\int_{t_{0_j}}^{t_{1_j}} u(\tau) - R \cdot i(\tau) d\tau = \int_{t_{0_j}}^{t_{1_j}} \frac{dL(\tau)}{d\tau} i(\tau) d\tau + \int_{t_{0_j}}^{t_{1_j}} L(\tau) \frac{di(\tau)}{d\tau} d\tau \quad (21)$$

If one divides this equation by the current level difference, and replaces the left hand side by the estimated inductance $\hat{L}_j^{LS}$, then one obtains $$\hat{L}_j^{LS} = \frac{1}{\Delta i_j} \int_{t_{0_j}}^{t_{1_j}} \left( \frac{dL(\tau)}{d\tau} i(\tau) + L(\tau) \frac{di(\tau)}{d\tau} \right) d\tau \quad (22)$$

For the subsequent calculation, the following assumptions are made, these being very well fulfilled in most cases:

The derivative with respect to time of the current is estimated by $$\frac{di_j(t)}{dt} \approx \frac{\Delta i_j}{\Delta t_j} \quad (23)$$

This assumption is very well fulfilled when the duration of the PWM period is sufficiently small, and hence the current waveform is approximately triangular.

It is assumed that the derivative with respect to time of the inductance is constant within the duration of one PWM period, i.e. $dL(t)/dt = \dot{L} = $const.

If one inserts these assumptions into equation (22) then one directly obtains $$\hat{L}_j^{LS} = \frac{\dot{L}}{\Delta i_j}\int_{t_{0j}}^{t_{1j}} i(\tau)d\tau + \underbrace{\frac{1}{\Delta t_j}\int_{t_{0j}}^{t_{1j}} L(\tau)d\tau}_{\overline{L}} \qquad (24)$$

In this, $\overline{L}$ is the mean value of L(t) which is to be estimated.

If one then introduces the mean current value over a subperiod $$\overline{i}_j = \frac{1}{T_s N_j}\int_{t_{0j}}^{t_{1j}} i(\tau)d\tau \approx \frac{1}{N_j}\sum_{k_j=0}^{N_j-1} i_k \qquad (25)$$

with the sampling interval $T_S$ and the number of measurement points $N_j$, then the mean inductance which is to be estimated is calculated as $$\overline{L} = \hat{L}_1^{LS} - \dot{L}T_S\frac{N_1\overline{i}_1}{\Delta i_1} = \hat{L}_2^{LS} - \dot{L}T_S\frac{N_2\overline{i}_2}{\Delta i_2} \qquad (26)$$

from the least squares estimates for the subperiods concerned. It can be seen that by a suitable weighting of the two least squares estimates $\hat{L}_j^{LS}$ it is possible to compensate for the unwanted effect of a change in inductance L and thus for the influence of the speed w of the object.

A simple reorganization of equation (26) with the elimination of the derivative of the inductance with respect to time leads to the mean value of the inductance $$\overline{L} = \frac{N_2\overline{i}_2\Delta i_1\hat{L}_1^{LS} - N_1\overline{i}_1\Delta i_2\hat{L}_2^{LS}}{N_2\overline{i}_2\Delta i_1 - N_1\overline{i}_1\Delta i_2} \qquad (27)$$

It will be noted that all the variables which appear in this have already been calculated in the least squares identification. This means it is also possible to obtain a meaningful estimated value for the inductance of the system even if the object for which the bearing is to be used is not stationary, i.e. w≠0.

For the special case of only small changes in the mean value of the current, it is true that the current level differences $\Delta i_1 \approx -\Delta i_2$ and thus the mean current values $\overline{i}_1 \approx \overline{i}_2$ are approximately equal, so that the averaging degenerates to a cross-weighted averaging $$\overline{L} = \frac{N_1\hat{L}_2^{LS} + N_2\hat{L}_1^{LS}}{N_2 + N_1} \qquad (28)$$

This calculation is of course significantly easier to effect, but may supply inaccurate results if, for example, a controller commands large changes in the current (and thus the duty cycle).

Determination of the Position from the Mean Inductance

In the above method, the mean value $\overline{L}$ has been determined for the inductance together with the derivative with respect to time $\dot{L}$ of the inductance. At the end, the present position r and/or the speed w of the object for which the bearing is to be used must be determined from these values.

For this purpose, use is made of a model approach, based on the reluctance model according to equation (2), which describes the inductance L(r) as a function of the position r of the object for which the bearing is to be used. If one writes $L^M(r)$ for the functional relationship between the inductance and the position r, then one obtains an estimated value $\hat{r}$ for the position by inverting this relationship:

$$\hat{r}=(L^M(r))^{-1}(\overline{L}) \qquad (29)$$

In many cases the speed w is also required for the purpose of stabilizing the object for which the bearing is to be used. Classically, this is determined by an approximating differentiation of the estimated position $\hat{r}$. However, this approach has the disadvantage that measurement noise can lead to a very noisy estimate of the value for the speed, and the introduction of a phase displacement by the approximating differentiation, which can in turn lead to stability problems in the closed control loop.

The algorithm developed can calculate the speed directly from the estimated inductance values, without differentiation. If one considers that for the derivative with respect to time $\dot{L}$ of the inductance the following applies $$\dot{L} = \frac{\partial L(r)}{\partial r}\cdot w, \qquad (30)$$

one can obtain directly the following expression as an estimate of the present speed of the object for which the bearing is required:

$$\hat{w} = \frac{\hat{L}_2^{LS} - \hat{L}_1^{LS}}{T_s}\left(\frac{\partial L^M(r)}{\partial r}\bigg|_{r=\hat{r}^{LS}}\right)^{-1}\frac{\Delta i_1 \Delta i_2}{N_2\overline{i}_2\Delta i_1 - N_1\overline{i}_1\Delta i_2}. \qquad (31)$$

In summary, an algorithm has been developed for estimating the position r and the speed w of an object for which a bearing is to be provided by a magnetic bearing, wherein this algorithm is distinguished by the following characteristics:

The calculation can be split up into a mathematically very simple part, which must be calculated with a fast sampling interval, and a complex part which can be determined with a significantly slower sampling interval. In respect of an economical implementation, in particular, this represents a significant advantage compared to known methods.

By weighting the estimated inductance values, it is possible to draw conclusions about both the position and the speed of the object for which the bearing is to be used. This enables the influences of the speed and the pulse width to be suppressed.

Estimating the Resistance and Adjusting the Resistance

Up to this point it has been assumed that the electrical resistance R of the electric circuit is constant and known. Now this resistance will change in operation, due to temperature changes. Hence, an estimate of the resistance R brings further advantages for a practical implementation.

In a development, the electrical resistance required for the sensorless state estimation of a magnetic bearing is adjusted on the basis of the resistance-dependent estimated inductance error.

In the determination of the estimated values $\hat{L}_j^{LS}$ using least squares identification, described above, it has been assumed that the inductance is constant for the time of the rising flank (j=1) and of the falling flank (j=2) over the duration of one PWM period, i.e. the starting point was equation (18). If one now considers the electrical resistance $R_n$ as the superimposition of the estimated resistance $\hat{R}$ and a resistance error $\delta R$ as in $$R_n = \hat{R} + \delta R, \tag{32}$$

this gives, for the erroneous estimate of the inductance $$\hat{L}_{j,s}^{LS} \frac{di(t)}{dt} = u - \hat{R} \cdot i(t) \tag{33}$$

where $$i(0) = i_0 \text{ and } j \in \{1, 2\}$$

If one considers the total differential of the flux chain, in the form $$\frac{d\psi(t)}{dt} = \frac{dL_n(t)}{dt} i(t) + L_n(t) \frac{di(t)}{dt} = u(t) - R_n i(t), \tag{34}$$

or, using equation (33)

$$\hat{L}_{j,s}^{LS} \frac{di(t)}{dt} = \frac{dL_n(t)}{dt} i(t) + L_n(t) \frac{di(t)}{dt} + \delta R i(t), \tag{35}$$

and integrates over the time interval $\Delta t_j = t_{1_j} - t_{0_j}$, then, after dividing by the current level difference, one obtains $$\hat{L}_{j,s}^{LS} = \frac{1}{\Delta i_j} \int_{t_{0j}}^{t_{1j}} \left( \frac{dL_n(\tau)}{d\tau} + \delta R \right) i(\tau) d\tau + \frac{1}{\Delta i_j} \int_{t_{0j}}^{t_{1j}} L_n(\tau) \frac{di(\tau)}{d\tau} d\tau. \tag{36}$$

For the rest of the calculation, the following assumptions are again made:

The derivative with respect to time of the current is estimated by:

$$\frac{di_j(t)}{dt} \approx \frac{\Delta i_j}{\Delta t_j}, \ j \in \{1, 2\}$$

This assumption is very well fulfilled when the duration of the PWM period is sufficiently small, and hence the current waveform is approximately triangular.

It is assumed that the derivative with respect to time of the inductance is constant within the duration of one PWM period, i.e. $dL_n(t)/dt = \dot{L}_n$=const.

If one inserts these two assumptions into equation (36) then one directly obtains $$\hat{L}_{j,s}^{LS} = \frac{\dot{L}_n + \delta R}{\Delta i_j} \int_{t_{0j}}^{t_{1j}} i(\tau) d\tau + \underbrace{\frac{1}{\Delta t_j} \int_{t_{0j}}^{t_{1j}} L(\tau) d\tau}_{\overline{L}_n}, \tag{37}$$

where $\overline{L}_n$ is the mean value of $L_n(t)$ which is to be estimated. If one then introduces the mean current value over a subperiod $$\bar{i}_j = \frac{1}{T_s N_j} \int_{t_{0j}}^{t_{1j}} i(\tau) d\tau \approx \frac{1}{N_j} \sum_{k_j=0}^{N_j-1} i_k, \tag{38}$$

with the sampling interval $T_s$, the number of measurement points $N_j$, $j \in \{1, 2\}$, then the mean inductance which is to be estimated is calculated as $$\overline{L}_n = \hat{L}_{1,s}^{LS} - (\dot{L}_n + \delta R) T_s \frac{N_1 \bar{i}_1}{\Delta i_1}, \tag{39}$$

or $$\overline{L}_n = \hat{L}_{2,s}^{LS} - (\dot{L}_n + \delta R) T_s \frac{N_2 \bar{i}_2}{\Delta i_2}. \tag{40}$$

The difference between the two estimated inductance values is then given by:

$$\hat{L}_{2,s}^{LS} - \hat{L}_{1,s}^{LS} = (\dot{L}_n + \delta R) T_s \left( \frac{N_2 \bar{i}_2}{\Delta i_2} - \frac{N_1 \bar{i}_1}{\Delta i_1} \right) \tag{41}$$

If one replaces the derivative with respect to time of the inductance in equation (39) or (40) with that from equation (41), one obtains the mean value $$\overline{L}_n = \frac{N_2 \bar{i}_2 \Delta i_1 \hat{L}_{1,s}^{LS} - N_1 \bar{i}_1 \Delta i_2 \hat{L}_{2,s}^{LS}}{N_2 \bar{i}_2 \Delta i_1 - N_1 \bar{i}_1 \Delta i_2}, \tag{42}$$

which is independent of the estimated value of the resistance. However, for a practical implementation with a limited accuracy of measurement and calculation, it is sensible to estimate the electrical resistance.

Adjustment of the Electrical Resistance

Because of the temperature changes in the overall system, the electrical resistance changes, as already mentioned above.

A method of resistance adjustment is proposed which is based on the fact that the estimation of an incorrect resistance value is reflected in the estimated inductance error $$\Delta \hat{L} = \hat{L}_{2,s}^{LS} - \hat{L}_{1,s}^{LS} \tag{43}$$

(cf. equation (41)).

According to equation (41), the inductance error $\Delta \hat{L}$ is proportional to the sum of the resistance error $\delta R$ and the total derivative with respect to time of the inductance $\dot{L}_n$. Furthermore, applying equation (30) with the chain rule for differentiation gives $$\dot{L} = \frac{\partial L(r)}{\partial r} \cdot w$$

for the total derivative with respect to time of the inductance. However, the total derivative with respect to time $\dot{L}_n$ is only zero if the speed is zero, i.e. w=0, because the partial derivative of the inductance with respect to the air gap never becomes zero for a real system. Thus, from a purely theoretical point of view, a method of adjustment which consists only of an I controller will function on the basis of the inductance error solely for a stationary object. The method of resistance adjustment cited here filters the inductance error beforehand, and thus eliminates the influence of the speed.

For a stationary object the electrical resistance can accordingly be estimated by slowly regulating the inductance error $\Delta \bar{L}$ down to zero, because for a stationary object it is the case that $\dot{L}_n = 0$ and hence the inductance error $\Delta \hat{L}$ is, according to equation (41), directly proportional to the resistance error $\delta R$. The change in resistance which is produced by the heating of the electromagnet is significantly slower than the dynamics or change in position, as applicable, of the object for which the bearing is to be used. Consequently it is possible with the aid of low pass filter $$\frac{d}{dt}\Delta \bar{L} = -\frac{1}{T_{LF}}(\Delta \bar{L} - \Delta \hat{L}), \Delta \bar{L}(0) = \Delta \bar{L}_0 \quad (44)$$

to filter out or eliminate, as applicable, any disruptive speed-dependent portion $\dot{L}_n$ which there may be in the inductance error cf. equation 41. The speed-independent inductance error $\Delta \bar{L}$ is regulated down to zero by an I controller $$\frac{d}{dt}\hat{R} = -\frac{1}{T_{RA}}\Delta \bar{L}, \hat{R}(0) = \hat{R}_0 \quad (45)$$

A Correct Resistance Value is then Estimated.

The resistance adjustment may be provided by a low-pass filter and an I controller. The resistance adjustment, described by equations (44) and (45) based on the inductance error of the position estimation on a least squares basis, ensures that the resistance error $\delta R$ is controlled down to zero, so that the real resistance value is estimated. In this process, $T_{LF}$ and $T_{RA}$ are positive adjustment parameters.

For the purpose of implementation on a digital computer, equations (44) and (45) are discretized with respect to time. However, this discretization is not unique. In the simplest case, the continuous differentiation is replaced by the forward difference quotient (Euler (forward) method). From this one obtains a so-called difference equation. Using this, it is possible to compute, at equidistance intervals of time, a new estimated value from the previous one. The estimated resistance value is passed on to the position estimation procedure, whereby a new estimated value for the inductances is calculated and this gives a new estimated value for the inductance error. This iteration is carried out in each sampling interval.

Higher-Level Observer

As will be seen from the derivations presented above, absolutely no data about the dynamics or characteristics of the object (e.g. its mass, damping etc.) was used in the determination of the position and speed of the object for which the bearing is to be used. This is a great advantage insofar as this method also provides very good position and speed data, even if only little is known about the object for which the bearing is to be used.

On the other hand, in many applications a relatively accurate knowledge of the object for which the bearing is required is available, so that it can be logical to combine the above estimation algorithm with a status observer. Using an observer one could, for example, achieve a significant reduction in the noise for the position and the speed, could identify in addition individual parameters of the object for which the bearing is required or estimate the load forces which are imposed on the object. For the possible observer structures, consideration could be given to linear observers (Luenberger observer, Kalman filter etc.) through to modern non-linear methods such as the extended Kalman filter, the uncentered Kalman filter or normal form observers. Since the essentials of these methods are known from the literature, we forgo a more detailed exposition at this point. However, attention is called to the fact that it is only in combination with the above algorithm for position and speed estimation that these observers can satisfy the accuracy and dynamics requirements.

Important Qualitative and Quantitative Advantages

For the purpose of reconstructing the state variables, the method requires no additional expenditure on hardware, because inherent measurement effects invoked by the pulse width modulated actuation are exploited. Only a current and voltage measurement facility must be available.

If the algorithm is combined with an observer, then it is possible, from the point of view of system theory, to separate the complete system algorithmically into an electrical and a mechanical subsystem and moreover to use the complete model data for the entire system for the purpose of obtaining the states.

The separate treatment of the charging up and discharge processes for the least squares estimation of the inductances offers, on the one hand, the possibility of reducing the influence of the integrator drift due to the discretization of Faraday's law. On the other hand it is possible, in the technical software implementation, to shut out the transient noise characteristics of the non-ideal electrical switching elements of the inverter during their switching on and off, and the influence of eddy currents.

By constructing the least squares estimator as a multirate system it is furthermore possible to significantly reduce the computational costs. The calculation of the regressors can be implemented in integer arithmetic at low cost on programmable integrated circuits (e.g. FPGA), so that very short sampling intervals and relatively accurate estimates of the inductances, and thus the state variables, can be obtained. The computationally intensive operations can furthermore be effected at longer sampling intervals.

The use of a position- and speed-dependent model for the inductance and the subsequent regression appears computationally intensive, because it requires additional parameters. However, neglecting the effect of the speed in Faraday's law leads to a speed-dependent split in the estimation of the inductances for the charging up and discharge processes. A theoretical investigation has shown that the individual inductances can be corrected using an averaging procedure which uses the current level differences, the number of measurement points and the mean current values in the subperiods. It has shown, further, that the difference in the individual inductances is proportional to the speed, and can be determined analytically by making use of the inductance model.

Unlike the known estimation methods, it is possible to estimate directly from the estimation algorithm not only the position but also the speed. Typically, only the estimated position is fed back to the position controller, which generally provides compensation for the non-linearities and a stabilizing proportional-integral-differential controller, and a signal proportional to the speed is formed in the differential part of the controller. However, the noise in the position estimation has a detrimental and limiting effect on the quality of regulation which can be achieved and the robustness against uncertainties in the controller's model. If, as in the case of the estimation method which has been developed, an estimate of the speed is available in addition, then this can also be fed back and an increase achieved in the quality of regulation and robustness.

Over and above this, with a non-linear model-based observer system it is possible to incorporate the mechanical submodel of the overall system into the state estimation. Doing this permits, on the one hand, filtering for the purpose of suppressing noise in the position and speed estimates determined by the least squares estimator and, on the other hand, by including a noise variable approach in the model equations it is possible to estimate any externally imposed load force. Unlike known filtering, observer-based filtering is not accompanied by any phase shift.

The method permits separate estimation of the inductance of the charging up and discharge phases, using least squares estimation, so that it is possible to effect a separation into a fast but mathematically simple part and a slow mathematically more complex part.

The influence of the speed of the object for which the bearing is to be used and of any change in the pulse width of the voltage can be eliminated by a suitable correction.

The speed of the object for which the bearing is used can be determined directly from the estimated values of the inductance and other auxiliary variables, without differentiation with respect to time of the position.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for adjustment of a value of an electrical resistance of a magnetic bearing, comprising:
   actuating at least one electromagnet in the magnetic bearing by a pulse width modulated voltage having a waveform with at least one charging up phase as a first phase and at least one discharge phase as a second phase;
   measuring and evaluating a current i through and a voltage u across each electromagnet to determine first and second inductance values $\hat{L}_1^{LS}, \hat{L}_2^{LS}$ in the first phase and in the second phase;
   obtaining a least squares estimation of the first inductance value $\hat{L}_1^{LS}$ for the first phase and the second inductance value $\hat{L}_2^{LS}$ for the second phase, where an electrical resistance $R_n$ of the electromagnet in the magnetic bearing, is taken into account when making the estimate of the first and second inductance values $\hat{L}_1^{LS}, \hat{L}_2^{LS}$;
   determining an inductance error $\Delta \hat{L} = \hat{L}_2^{LS} - \hat{L}_1^{LS}$; and
   adjusting the electrical resistance by regulating the inductance error $\Delta \hat{L}$ down to zero.

2. The method as claimed in claim 1, wherein the resistance is adjusted by a low-pass filter and an integration controller.

3. The method as claimed in claim 2, wherein the inductance error is filtered by low-pass filtering $$\frac{d}{dt}\Delta \overline{L} = -\frac{1}{T_{LF}}(\Delta \overline{L} - \Delta \hat{L}).$$

4. The method as claimed in claim 3, wherein the inductance error $\Delta \hat{L}$ is regulated down to zero by an integration controller $$\frac{d}{dt}\hat{R} = -\frac{1}{T_{RA}}\Delta \overline{L}.$$

5. A method for the sensorless determination of a position of an object mounted in a magnetic bearing relative to an electromagnet in the magnetic bearing, comprising:
   actuating at least one electromagnet in the magnetic bearing by a pulse width modulated voltage having a waveform with at least one charging up phase as a first phase and at least one discharge phase as a second phase,
   measuring and evaluating a current i through and a voltage u across the electromagnet to determine first and second inductance values $\hat{L}_1^{LS}, \hat{L}_2^{LS}$ in the first phase and in the second phase,
   obtaining a least squares estimation of the first inductance value $\hat{L}_1^{LS}$ for the first phase and the second inductance value $\hat{L}_2^{LS}$ for the second phase, wherein an electrical resistance $R_n$ of the electromagnet in the magnetic bearing is taken into account when making the estimate of the inductance value $\hat{L}_1^{LS}, \hat{L}_2^{LS}$, where the electrical resistance $R_n$ is determined using a method as claimed in claim 1,
   calculating the position of the object relative to the magnetic bearing by reference to the estimated inductance values $\hat{L}_1^{LS}, \hat{L}_2^{LS}$.

6. The method as claimed in claim 5, wherein said calculating of the position of the object uses an inductance $\overline{L}$ determined by averaging the estimated inductance values $\hat{L}_1^{LS}, \hat{L}_2^{LS}$.

7. The method as claimed in claim 6, wherein a speed is calculated for the object from the estimated inductance values $\hat{L}_1^{LS}, \hat{L}_2^{LS}$.

8. The method as claimed in claim 7, wherein said measuring includes measuring the current $i_{k_j,j}$ (for $k_j=0, \ldots, N_j-1$) in the first phase at $N_1$ measurement points and in the second phase at $N_2$ measurement points.

9. The method as claimed in claim 8, wherein said measuring includes, for each of the first phase and the second phase, obtaining a mean current value $\overline{i}_j$ from the current values $i_{k_j,j}$ (for $k_j=0, \ldots, N_j-1$) measured at the $N_j$ measurement points.

10. The method as claimed in claim 9, further comprising:
    determining, for each of the first phase and the second phase, a current starting condition $\hat{i}_{0,j}$ and a current finishing condition $\hat{i}_{N_j-1,j}$ by a least squares method;
    determining, from the current starting and finishing conditions, current level differences $\Delta i_j = \hat{i}_{N_j-1,j} - \hat{i}_{0,j}$ for the first phase and for the second phase; and
    inputting the current level differences $\Delta i_j$ into the least squares estimation of the first and second inductance values $\hat{L}_1^{LS}, \hat{L}_2^{LS}$.

11. The method as claimed in claim 10, further comprising:
    calculating a mean value $\overline{L}$ of the inductance, and from the mean value $\overline{L}$ of the inductance at least one of the position and the speed of the object, using the current level differences $\Delta i_j = \hat{i}_{N_j-1,j} - \hat{i}_{0,j}$ determined from the current starting and current finishing conditions, the numbers $N_1, N_2$ of measurement points, the current mean value $\overline{i}_j$ in the first and the second phase and the difference between the estimated inductance values $\hat{L}_1^{LS}, \hat{L}_2^{LS}$ for the first and the second phase.

* * * * *